INVENTOR.
WAYNE M. SCHAAP
BY
ATTORNEY

INVENTOR.
WAYNE M. SCHAAP
BY
ATTORNEY

Fig. 14

United States Patent Office 3,427,909
Patented Feb. 18, 1969

1

3,427,909
TUBE RECUTTER
Wayne M. Schaap, Rochester, N.Y., assignor to M. D. Knowlton Company, Monroe County, N.Y.
Filed Nov. 7, 1966, Ser. No. 592,551
U.S. Cl. 82—101
Int. Cl. B23b 5/14
7 Claims

ABSTRACT OF THE DISCLOSURE

A floating mandrel rests upon a frame bed. Two stop means are provided, one at each end of the mandrel and each capable of preventing longitudinal displacement thereof. A tube is placed by longitudinal movement around the mandrel from a first end while the second end stop is engaged therewith. The tube is cut, the second end stop retracted while the first end stop is engaged, and the tube is drawn from the mandrel in the same longitudinal direction.

---

The present invention relates to a tube recutter and more particularly to a recutter for recutting cardboard tubing into shorter, precisely specified lengths.

It is an object of the present invention to provide a recutter which can be supplied with tubes manually or by mechanical arrangement directly from a tube cutoff machine.

It is another object of the present invention to provide a recutter which permits movement of the tube in any one longitudinal direction therethrough.

It is a further object of the present invention to provide a recutter having a floating mandrel.

It is a still further object of the present invention to provide a recutter having a mandrel which is fully, evenly and accurately supported throughout its entire length.

Other objects hereof will become evident from the description herein following.

2

Referring to the drawing, the recutter 10 of the present invention comprises a supporting framework 12 having a lower shelf 14 for support of various driving and control apparatus to be described and an upper shelf 16. Vertically upstanding from upper shelf 16 are two parallel end plates, infeed end plate 18 and outfeed end plate 19. End plates 18 and 19 have extending between them two parallel supporting rollers 20 and 21 and two parallel knife mounting plates 22 and 23.

End plates 18 and 19 have substantially similar dimensions, each having a feed opening extending downwardly between said rollers. Situated longitudinally of, parallel to and resting on supporting rollers 20 and 21 is a mandrel 30 having a tapered infeed end 31 and having an annular groove 32 being adjacent infeed end plate 18 and annular shoulder 33 being adjacent outfeed end plate 19.

Infeed end plate 18 has vertically and adjustably secured to it a first stop plate 34; outfeed end plate 19 has vertically and adjustably secured to it a second stop plate 35. Vertically slidably secured to stop plates 34 and 35 are first mandrel stop 36 and second mandrel stop 38 respectively. Mandrel stops 36 and 38 are positioned directly above annular groove 32 and annular shoulder 33 respectively. Each mandrel stop 36 and 38 is individually and selectively movable into or out of engagement with its respective annular groove 32 or annular shoulder 33. When first mandrel stop 36 is engaged in annular grove 32, mandrel 30 is constrained from any longitudinal movement whatsoever. When second mandrel stop 38 is engaged against annular shoulder 33, mandrel 30 is constrained against longitudinal displacement toward outfeed end plate 19. When mandrel stops 36 and 38 are both disengaged respectively from annular groove 32 and annular shoulder 33, mandrel 30 is not constrained against longitudinal displacement. Mandrel 30 has no other constraints or supports other than mandrel stops 36 and 38 as just mentioned and supporting rollers 20 and 21 upon which mandrel 30 rests.

The basic operation of recutter 10 is as follows: second mandrel stop 38 is lowered so as to engage annular shoulder 33 of mandrel 30 thereby preventing mandrel 30 from moving longitudinally toward outfeed end plate 19. A tube 40 is placed about mandrel 30 by feeding it in past the tapered infeed end 31 of mandrel 30 until it contacts and is stopped by second mandrel stop 38. Tube 40 is cut to desired length or lengths, second mandrel stop 38 retracts upwardly out of engagement with annular shoulder 33, first mandrel stop 36 is lowered into annular groove 32 and the cut lengths of tube 40 are drawn off mandrel 30 across the output end thereof. Further details of the operation of recutter 10 will be hereinafter described.

Mounted on knife mounting plates 22 and 23 are a plurality of retractable knives 42 each of which may be positioned at any desired location along one of said plates 22 and 23 and secured at such position by means of a set screw 44. Each knife 42 has a circular cutter 46 which is advanceable to contact and cut tube 40. Advancement and retraction of cutter 46 is accomplished by means of air cylinders but may, of course, have any suitable retracting means such as hydraulic cylinders or the like.

Supporting rollers 20 and 21 are connected by means of suitable gearing to a source of rotational power such that rollers 20 and 21 rotate at the same speed in the same direction thereby axially rotating mandrel 30 and tube 40 which are supported on said rollers.

Figure 1:
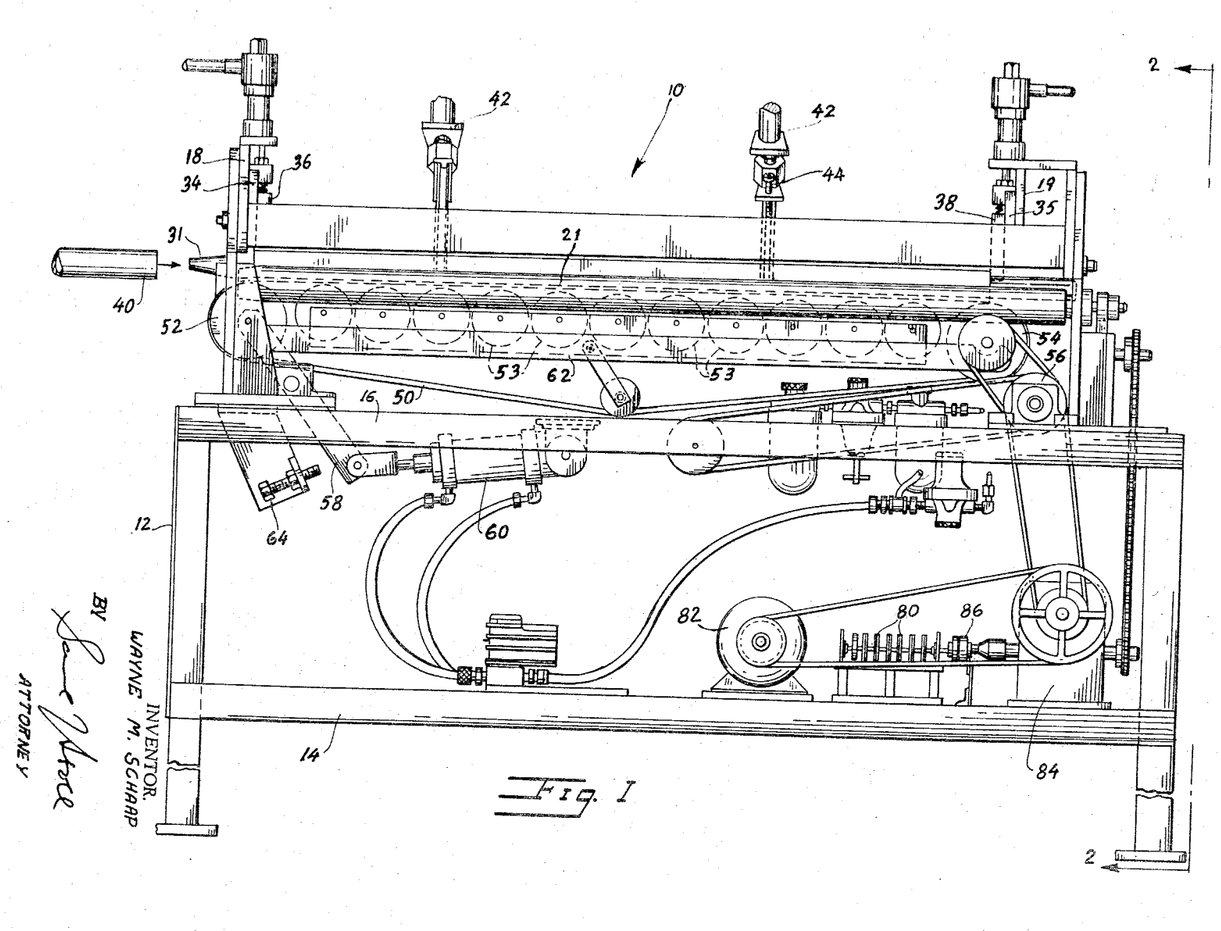
FIGURE 1 is a front view of the recutter according to the present invention showing the transport rollers and the upper run of the transport belt in phantom.
Figure 2:
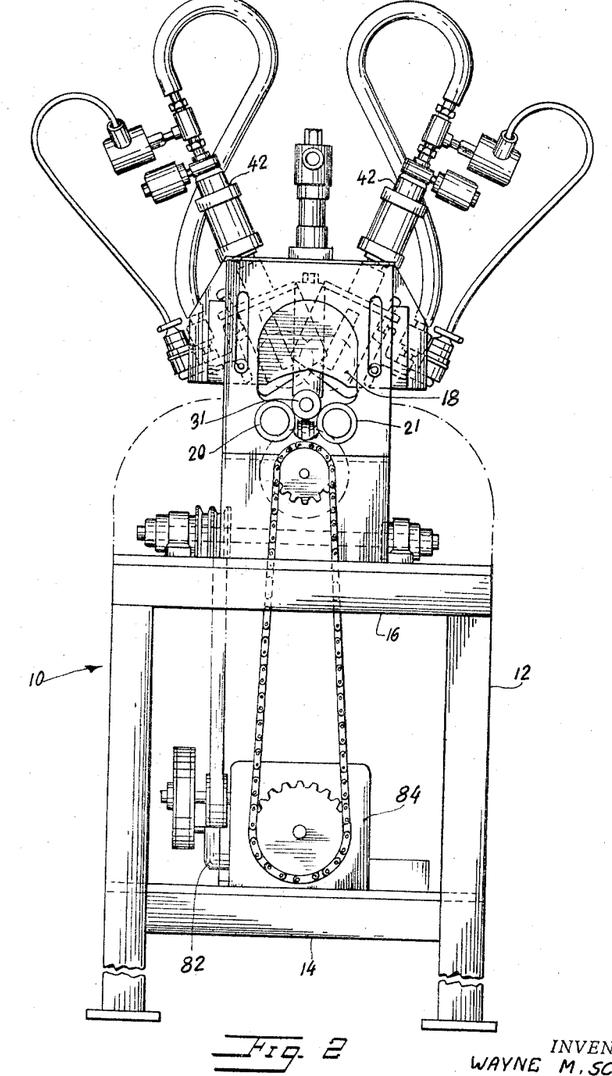
FIGURE 2 is a right side view of the recutter according to the present invention as viewed across line 2—2 of FIGURE 1 showing certain of the mechanical details in phantom.
Figure 3:
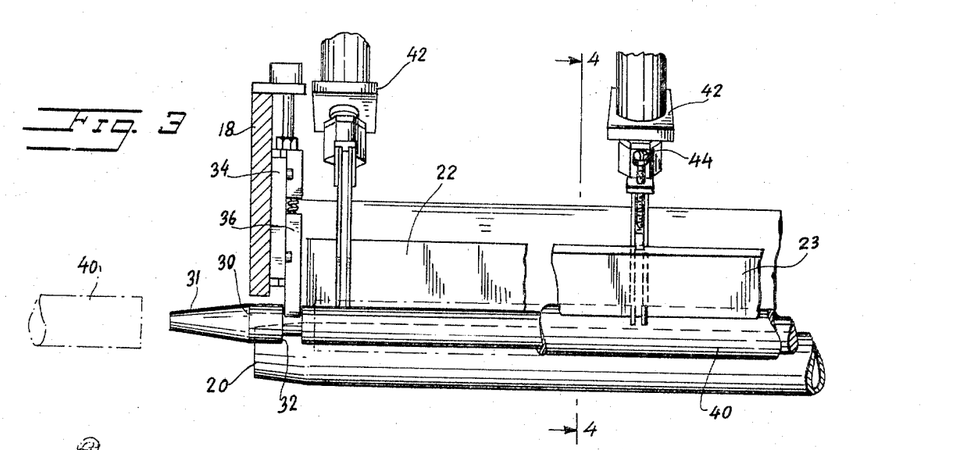
FIGURE 3 is a fragmentary front view of the input end of the mandrel with supporting structure and cutters and showing a tube in phantom.
Figure 4:
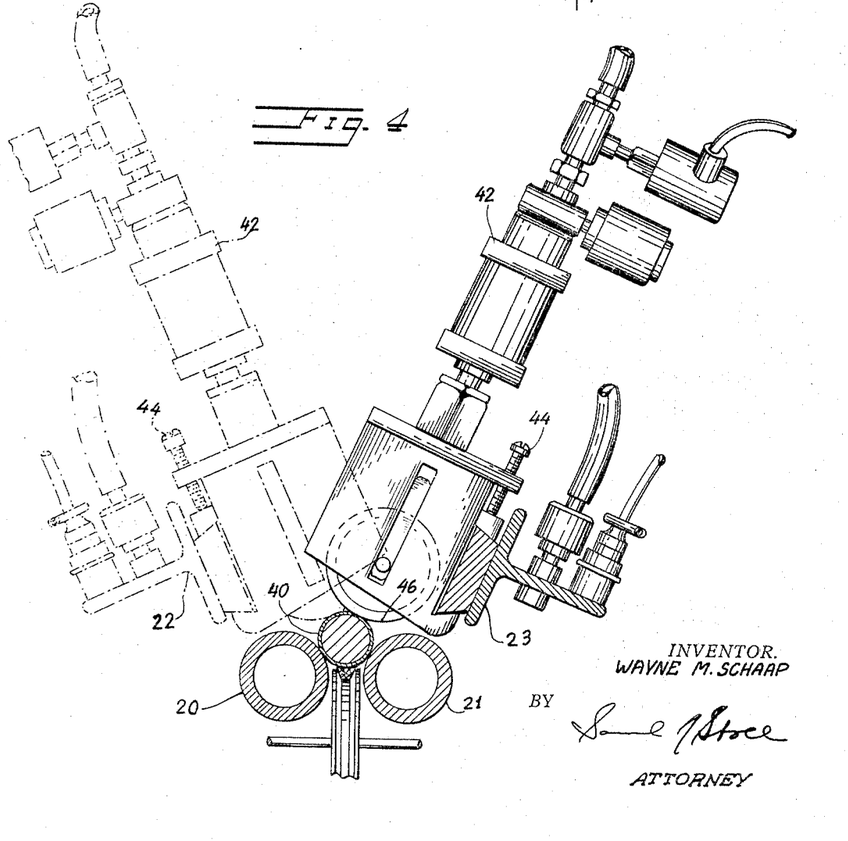
FIGURE 4 is a cross sectional view taken across line 4—4 of FIGURE 3 additionally showing a second cutter in phantom.

A conveyor belt 50 extends longitudinally of and between rollers 20 and 21, conveyor belt 50 being supported by an infeed end pulley 52, a plurality of closely spaced transport pulleys 53 and an outfeed end pulley 54. Pulley 54 is connected to a power source 56. Pulley 52 is mounted on one end of a pivoting lever 58 the other end of which is connected to an air cylinder 60. Transport pulleys 53 are rotably mounted on a bar 62 which extends from and is supported by pulley 52 to pulley 54 which provides a pivoting support therefor. When cylinder 60 is in its extended position as shown in FIGURE 1, the extent of which is determined by a limit 64, pulley 52, transport pulleys 53 and conveyor belt 50 are in their uppermost position, conveyor belt 50 being in contact with tube 40 thereby pulling tube 40 onto mandrel 30 before the cutting operation or pushing the cut portions of the tube 40 off mandrel 30 after the cutting operation. Tube 40 and mandrel 30 are raised above supporting rollers 20 and 21 and accordingly do not axially rotate therewith. As viewed in FIGURE 1 conveyer belt 50 travels in a clockwise direction. When air cylinder 60 is in retracted position pulley 52, transport pulley 53 and conveyer belt 50 are in their lowermost position and do not contact tube 40; tube 40 is now resting on supporting rollers 20 and 21 and, along with mandrel 39, axially rotating therewith.

Figure 12:
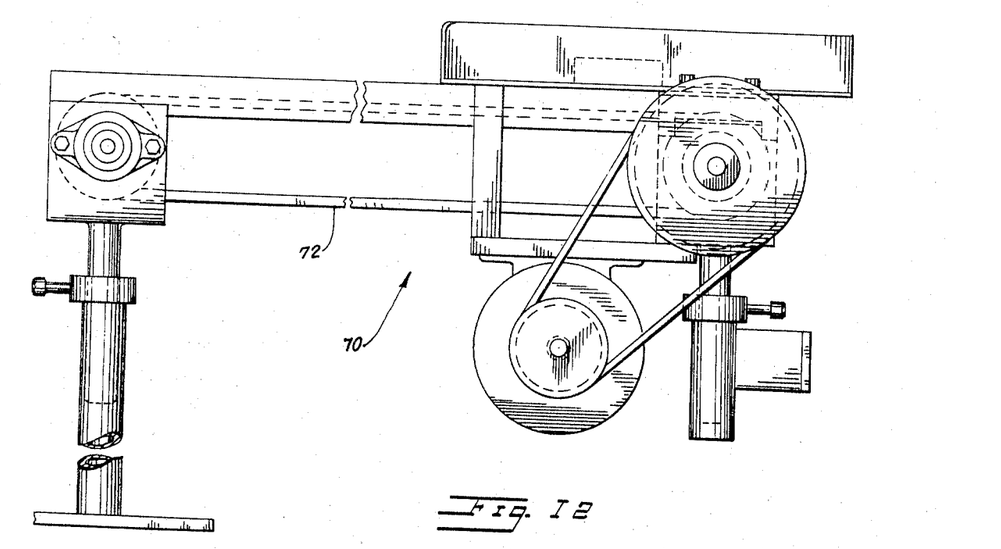
FIGURE 12 is a front view of the infeed conveyor mechanism according to the present invention.
Figure 13:
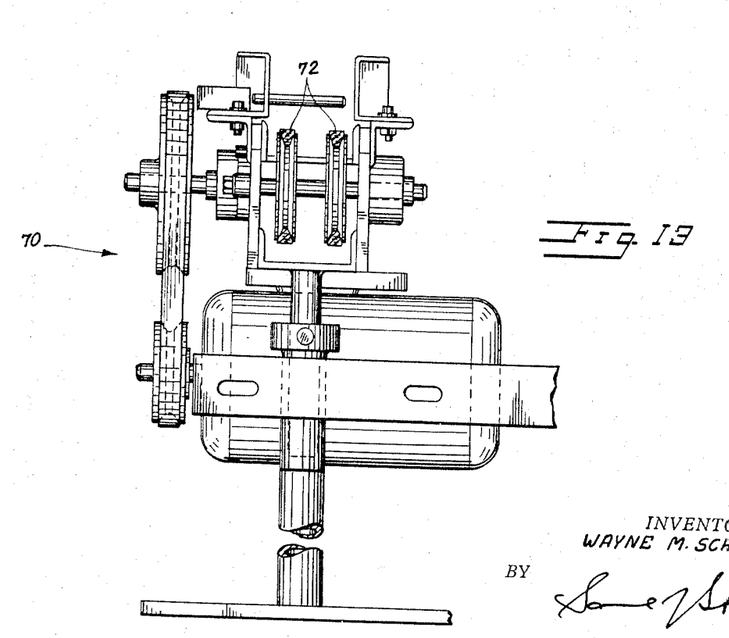
FIGURE 13 is a right side view of the infeed conveyer mechanism of FIGURE 12.

Tube 40 is initially brought into contact with conveyer belt 50 by an infeed conveyer means 70 which is generally separate from but is used in conjunction with recutter 10. Infeed conveyer 70 as shown in FIGURES 12 and 13 consists primarily of a pair of V-belts along which tube 40 is carried to the tapered infeed end of mandrel 30.

Figures 5, 6, 11:
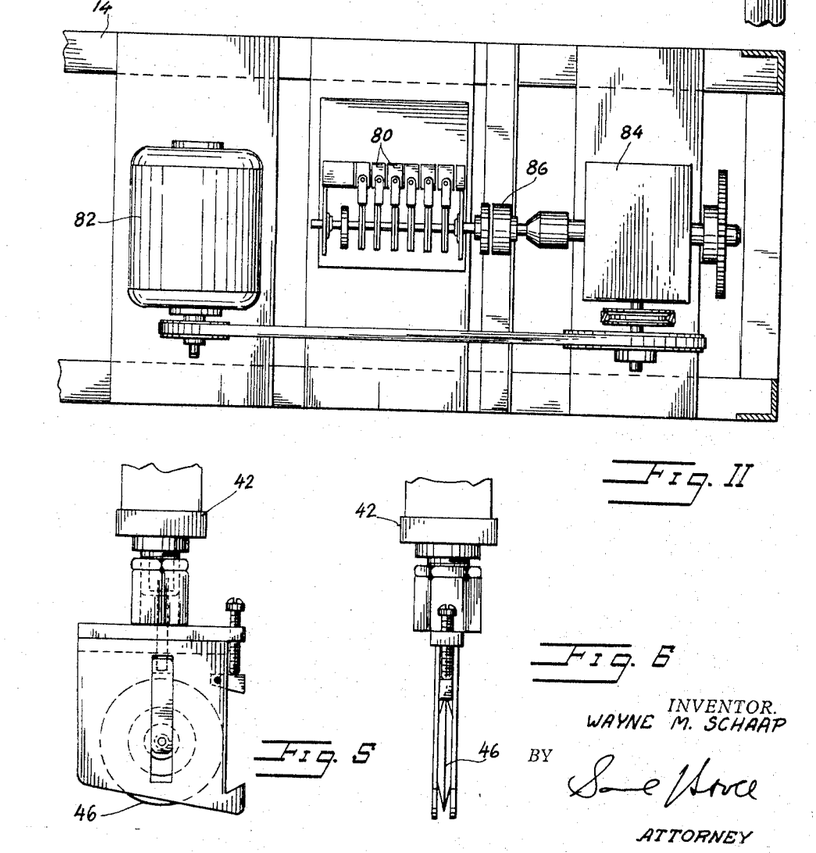
FIGURE 5 is a fragmentary side view of the lower portion of a cutter.
FIGURE 6 is a fragmentary front view of the cutter shown in FIGURE 5.
FIGURE 11 is a top view of the driving and control mechanism of FIGURE 10.
Figure 7:
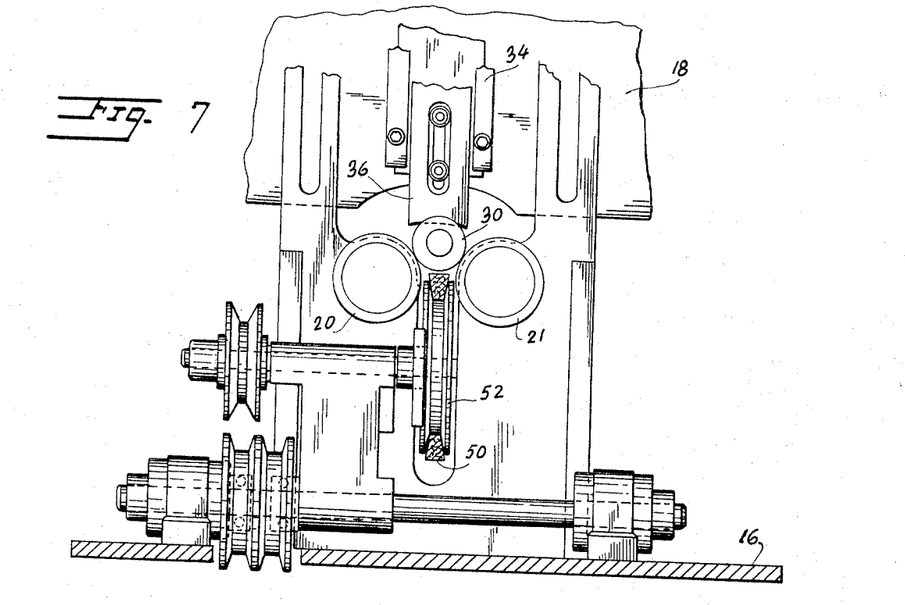
FIGURE 7 is a fragmentary cross sectional view taken across line 7—7 of FIGURE 1.
Figure 8:
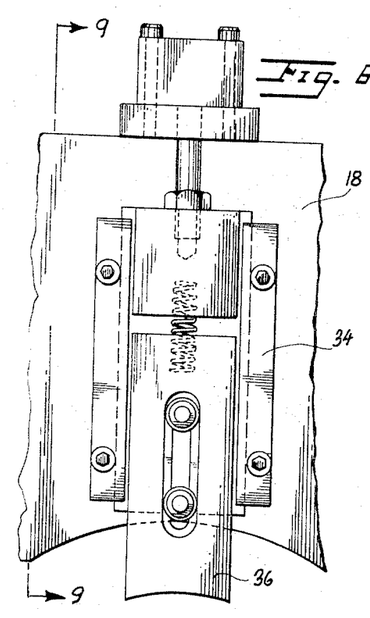
FIGURE 8 is a front view of a mandrel stop according to the present invention.
Figure 9:
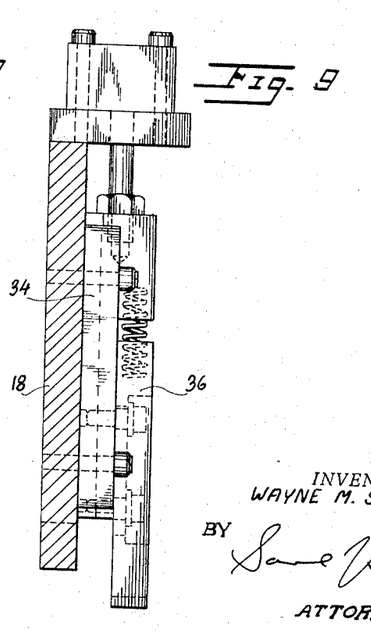
FIGURE 9 is a side view of the mandrel stop shown in FIGURE 8.
Figure 10:
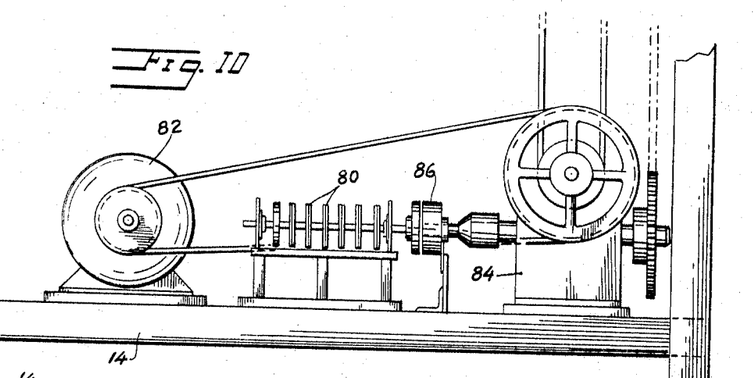
FIGURE 10 is a fragmentary front view of the driving and control mechanism of the recutter of the present invention.
Figure 14:
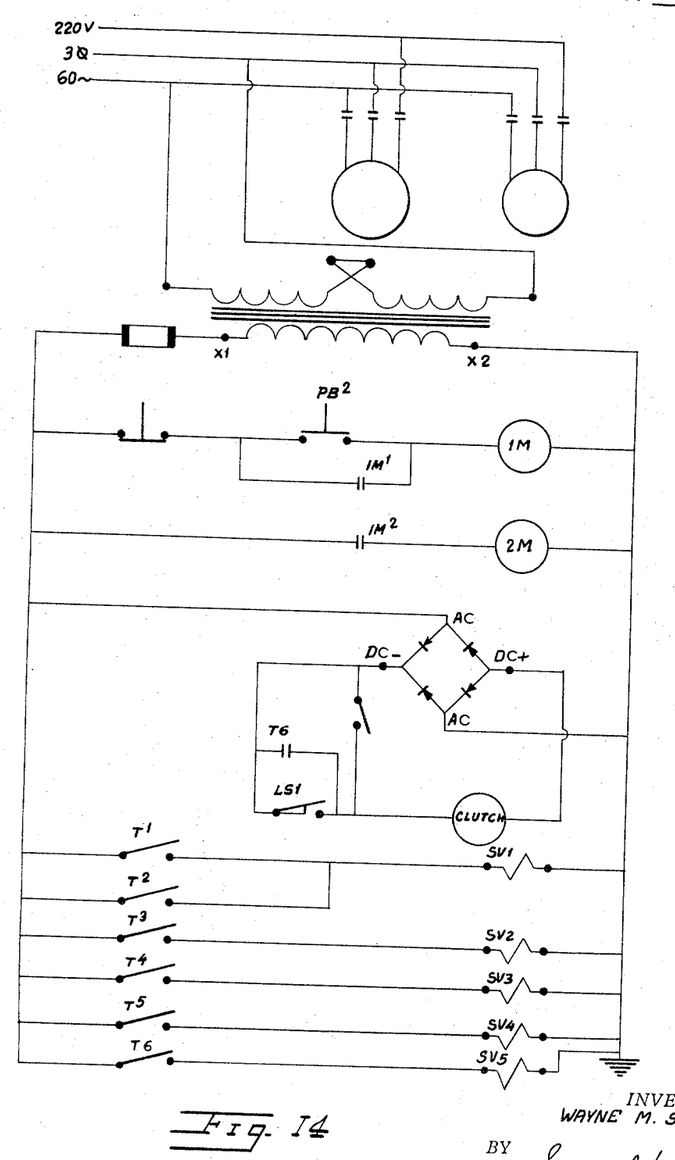
FIGURE 14 is a schematic circuit diagram according to the present invention.
Figure 15:
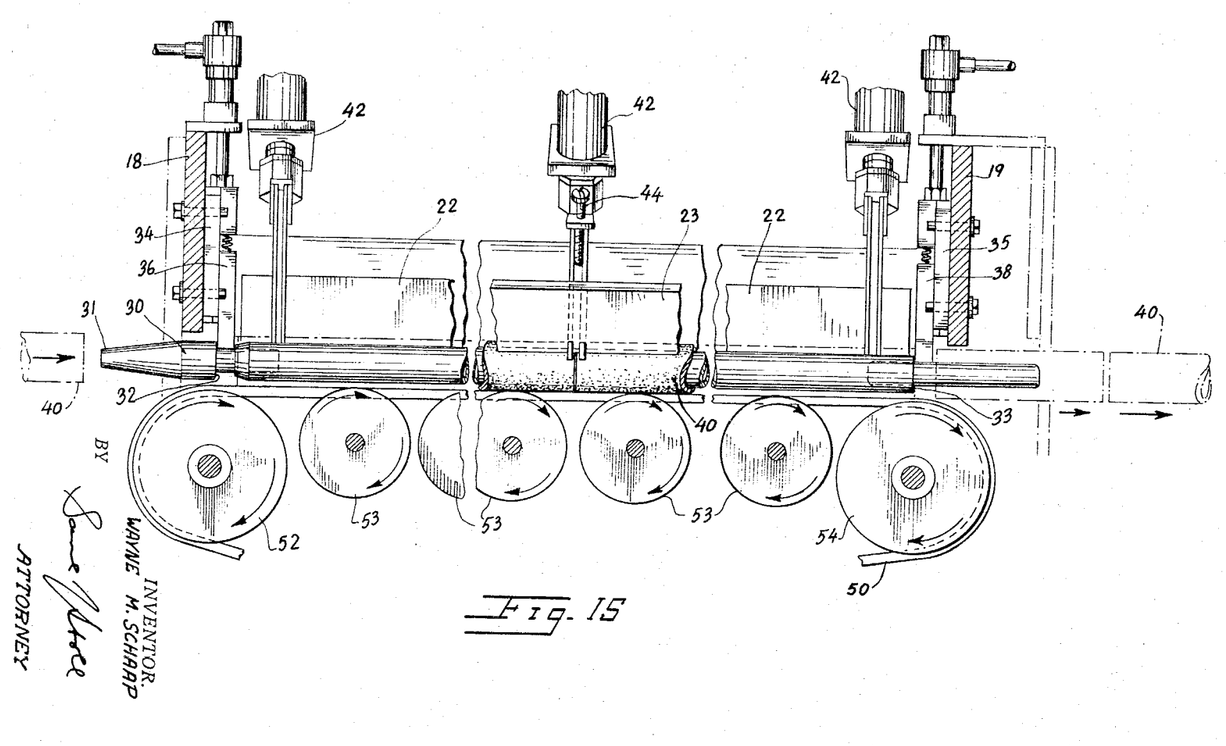
FIGURE 15 is a fragmentary front view of the mandrel, mandrel stops, transport rollers and knives.

The cyclic operation of recutter 10 is electrically controlled, an example of such a control circuit being schematically shown in FIGURE 14. A multi-pole electrical switch 80, shown, for example, in FIGURES 10 and 11 to be a six pole rotary switch controls through suitable connections the operation of the various driving means and air cylinders. Rotary switch 80 is driven at a constant speed by motor 82 acting through a speed reducer 84 when a clutch 86 is engaged; when clutch 86 is disengaged rotary switch 80 does not rotate.

A further description of the cycle of operation of recutter 10 is as follows:

Infeed conveyer 70 operates to bring tube 40 along V-belts 72 to the tapered infeed end of mandrel 30. As tube 40 enters onto mandrel 30, first mandrel stop 36 is in its retracted position and second mandrel stop 38 is in its lowered position in engagement with annular shoulder 33. Tube 40 trips a switch, not shown in the drawing, which causes clutch 86 to engage and begin rotation of rotary switch 80. Air cylinder 60 is in its extended position and conveyer belt 50 is being driven in clockwise rotation. Tube 40 is drawn onto mandrel 30 by conveyer belt 50 until the leading edge of tube 40 meets second mandrel stop 38. The tube-advancing movement of conveyer belt 50 and V-belts 72 are stopped by rotary switch 80 which also causes air cylinder 60 to retract lever 58. Knives 42 are extended to tube 40 as rollers 20 and 21 rotate tube 40 and mandrel 30. When tube 40 has been thus cut into desired lengths knives 42 are retracted, first mandrel stop 36 lowers to engage annular groove 32, second mandrel stop 38 retracts upwardly, air cylinder 60 moves into extended position and conveyor belt 50 moves in a clockwise direction to draw the cut lengths of tube 40 off the outfeed end of mandrel 30 through outfeed end plate 19. The cutting cycle being complete, it repeats with infeed conveyer 70 advancing tube 40 onto mandrel 30.

First and second mandrel stops 36 and 38 may be made of a single piece of metal or, as shown in the drawing, may each consist of an upper portion 36a and 38a respectively, a lower portion 36b and 38b respectively and an intermediate spring 36c and 38c respectively. Such a two-piece and spring mandrel stops is preferable to prevent smaller or lighter weight mandrels from lifting or tilting under pressure from the mandrel stop.

Although various lengths of tube 40 may be cut by recutter 10, it is preferable that such lengths be less than the distance between first mandrel stop 36 and second mandrel stop 38 so as to permit such stops to engage annular groove 32 and annular shoulder 33 without interference from tube 40.

Various moving parts of recutter 10 are automatically actuated at given points in the cycle as controlled by switch 80.

While the foregoing is illustrative of a preferred form of this invention it is apparent that modifications may be made and other forms provided within the broad spirit of the invention and the broad scope of the claims.

What is claimed is:

1. A tube recutter, comprising:
   a frame, said frame haing an input side and an output side opposite said input side;
   support means, said support means being situated between said input side and said output side of said frame;
   a floating mandrel, said floating mandrel resting upon said support means and extending from said input side to said output side of said frame;
   mandrel stop means, said mandrel stop means being engageable with said floating mandrel to prevent longitudinal displacement thereof;
   unidirectional tube transport means, said unidirectional tube transport means transporting the tube onto said floating mandrel in a longitudinal direction, and transporting the cut lengths of the tube off said floating mandrel in the same longitudinal direction;
   tube cutting means; and
   drive and control means.

2. A tube recutter in accordance with claim 1, wherein said mandrel stop means comprises:
   a first mandrel stop, said first mandrel stop being selectively engageable and disengageable with said floating mandrel and preventing longitudinal displacement of said floating mandrel when so engaged; and
   a second mandrel stop, said second mandrel stop being selectively engageable and disengageable with said floating mandrel and preventing longitudinal displacement of said floating mandrel when so engaged.

3. A tube recutter in accordance with claim 2, wherein said floating mandrel includes:
   a first recess, said first recess being engageable by said first mandrel stop; and
   a second recess, said second recess being engageable by said second mandrel stop.

4. A tube recutter in accordance with claim 3, wherein:
   said first recess is an annular grove; and
   said second recess is an annular shoulder.

5. A tube recutter in accordance with claim 1, wherein said support means comprises:
   two spaced parallel support rollers, said support rollers each being axially rotatable.

6. A tube recutter in accordance with claim 1, wherein said unidirectional tube transport means comprises:
   a conveyer belt, said conveyor belt being located between said support rollers, the upper run of said conveyor belt moving from the input side of said frame toward the output side thereof; and
   conveyer belt elevator means, said conveyer belt elevator means raising said conveyor belt into contact with the tube and said floating mandrel thereby elevating the tube and said floating mandrel above said support rollers, transporting cut portions of the tube off said floating mandrel at the output side of said frame, transporting uncut portions of the tube onto said floating mandrel at the input side of said frame ad lowering said conveyer belt out of contact with the tube and said floating mandrel, the tube and said floating mandrel resting upon said support rollers.

7. A tube recutter in accordance with claim 1, wherein said tube cutting means comprises:
at least one knife, each knife being positionally adjustable longitudinally of the tube and being advanceable toward the tube for cutting thereof and retractable away from said tube.

References Cited
UNITED STATES PATENTS

| | | | |
|---|---|---|---|
| 1,740,430 | 12/1929 | Mudd | 82—101 X |
| 1,840,095 | 1/1932 | Henry | 82—101 X |
| 2,553,052 | 5/1951 | Kwitek | 82—102 |
| 2,987,947 | 6/1961 | Light | 82—102 X |

HARRISON L. HINSON, *Primary Examiner.*